(12) United States Patent
Strom et al.

(10) Patent No.: US 9,423,283 B2
(45) Date of Patent: Aug. 23, 2016

(54) CUSTOMIZABLE DUCT MOUNT PITOT TUBE PRIMARY ELEMENT

(71) Applicant: Dieterich Standard, Inc., Boulder, CO (US)

(72) Inventors: Gregory Robert Strom, Boulder, CO (US); John Henry Stehle, Erie, CO (US)

(73) Assignee: Dieterich Standard, Inc., Boulder, CO (US)

( * ) Notice: Subject to any disclaimer, the term of this patent is extended or adjusted under 35 U.S.C. 154(b) by 238 days.

(21) Appl. No.: 14/227,510

(22) Filed: Mar. 27, 2014

(65) Prior Publication Data
US 2015/0276442 A1    Oct. 1, 2015

(51) Int. Cl.
*G01F 1/46*    (2006.01)

(52) U.S. Cl.
CPC ............ *G01F 1/46* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 3,751,982 A | 8/1973 | Lambert | |
| 4,197,740 A | 4/1980 | McNabney | |
| 4,444,060 A * | 4/1984 | Yamamoto | G01L 19/0007 73/861.66 |
| 4,624,146 A * | 11/1986 | Nakagawa | G01F 1/46 73/861.66 |
| 4,823,615 A * | 4/1989 | Taha | G01F 1/46 73/861.66 |
| 5,036,711 A * | 8/1991 | Good | G01F 1/46 73/861.66 |
| 5,730,652 A * | 3/1998 | Van Becelaere | F24F 11/04 73/861.66 |
| 5,969,266 A | 10/1999 | Mahoney et al. | |
| 6,044,716 A * | 4/2000 | Yamamoto | G01F 1/46 73/861.66 |
| 6,149,515 A * | 11/2000 | Van Becelaere | F24F 13/075 73/861.66 |
| 6,321,166 B1 * | 11/2001 | Evans | G01F 1/40 73/861.65 |
| 2006/0230825 A1 * | 10/2006 | Gryc | G01F 1/46 73/861.65 |

FOREIGN PATENT DOCUMENTS

| | | |
|---|---|---|
| DE | 35 27 425 | 2/1987 |
| DE | 42 07 043 | 9/1993 |

OTHER PUBLICATIONS

Product Data Sheet 00813-0100-4028, Rev. CA, "Rosemount 285 Annubar Primary Element" 2008-2009, pp. 1-12.
Notification of Transmittal of the International Search Report and the Written Opinion of the International Searching Authority from PCT/US2015/013025, dated Jun. 9, 2015.

* cited by examiner

*Primary Examiner* — Harshad R Patel
(74) *Attorney, Agent, or Firm* — Westman, Champlin & Koehler, P.A.

(57) ABSTRACT

A customizable duct mount averaging pitot tube (APT) assembly for use with a duct to measure a flow of fluid in the duct is provided. The APT assembly includes an APT primary element extending longitudinally between a first end and a second end. The APT primary element has first and second internal chambers extending longitudinally between the first and second ends. The APT primary element further includes an upstream face with an upstream opening which opens to the first internal chamber and extends from the first end to the second end, and a downstream face with a downstream opening which opens to the second internal chamber and extends from the first end to the second end. First and second duct mount flanges mount the respective first and second ends of the APT primary element to the duct when the APT primary element is inserted in the duct.

20 Claims, 10 Drawing Sheets

CUSTOMIZABLE DUCT MOUNT PITOT TUBE PRIMARY ELEMENT

BACKGROUND

The present disclosure relates to systems which monitor flow of fluids, namely gases, in a duct. More specifically, the present disclosure relates to duct flow primary elements, transmitters and systems of the type which provide duct flow measurements.

In industrial settings, control systems are used to monitor and control inventories of industrial and chemical processes, and the like. Typically, the control system that performs these functions uses field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Some field devices include a transducer which couples to the process fluid. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, actuators, solenoids, indicator lights, and others.

Field devices, such as process variable sensors used in industrial processes can be installed in the field on pipelines, tanks and other industrial process equipment like ducts. Such devices sense process variables such as process fluid flow, process fluid temperature, process fluid pressure, process fluid conductivity, process fluid pH and other process variables. Other types of industrial process field devices include valves, actuators, field controllers, data displays and communication equipment such as industrial field network bridges.

Duct flow measurements are commonly needed in industrial process or other applications. In duct flow measurement applications, reliable and repeatable measurements are typically required, while total measurement uncertainty is often a secondary consideration in this type of application. Commonly used duct flow measurement technologies include thermal mass flowmeters and pitot arrays. Thermal mass can be an accurate method of measuring flow in ducts. Unfortunately, the technology is susceptible to inaccuracy in applications with high humidity and can be difficult to verify. Pitot arrays are based on differential pressure (DP) principles and are therefore reliable, repeatable, and easily verified. However, they are expensive and need to be fabricated based on customer provided dimensions. This fact results in pitot array solutions with long lead times and requirements for customer supplied information inputs to the manufacturing process.

The averaging pitot tube (APT) is a type of primary element commonly used for flow measurement because of its ability to be inserted into and retracted from a duct or pipeline, its low pressure loss, and reliable performance. The APT primary element generates and averages pressures from multiple locations across a duct or pipeline through which a process fluid or gas is traveling. This average pressure is then used in conjunction with flow theory and experimentally determined quantities to provide a flow measurement for the fluid or gas. One type of APT primary element is the Annubar® APT available from Emerson Process Management.

One known solution for duct measurement is to use a relatively high cost APT primary element, such as the Annubar® APT, with a duct flange to couple the APT primary element to the duct. Such a solution is composed of relatively high cost parts designed for more severe applications such as pipeline fluid flow measurement. Using this type of APT primary element for making duct flow measurements, where total measurement uncertainty is not as critical as in other types of flow measurement applications, results in a relatively costly solution. Further, the APT primary element distribution model used by manufacturers typically requires communication of process conditions and duct dimensions through an ordering chain, pre-order sizing, and custom manufacturing processes. These limitations further increase costs, limit service level, and mitigate profitability to manufacturers.

SUMMARY

A customizable duct mount averaging pitot tube (APT) assembly for use with a duct to measure a flow of fluid in the duct is provided. The APT assembly includes an APT primary element extending longitudinally between a first end and a second end. The APT primary element has first and second internal chambers extending longitudinally between the first and second ends. The APT primary element further includes an upstream face with an upstream opening which opens to the first internal chamber and extends from the first end to the second end, and a downstream face with a downstream opening which opens to the second internal chamber and extends from the first end to the second end. First and second duct mount flanges mount the respective first and second ends of the APT primary element to the duct when the APT primary element is inserted in the duct.

DETAILED DESCRIPTION OF ILLUSTRATIVE EMBODIMENTS

Disclosed embodiments provide a lower cost, easily customizable APT primary element and mounting mechanism for use in a wide range of duct mount applications. For instance, in a contemplated order process, after a customer determines that they would like to know the flow rate in a duct, the customer contacts the manufacturer or distributor to order and specifies that the duct is square (or rectangular) or round, in which case the duct flanges would be curved to coincide with the outer wall of the duct, and the approximate distance across the duct (e.g., three foot diameter). It is verified that the fluid velocities exceed the minimum threshold for a main branch duct and an order for a duct measurement kit is entered. The manufacturer or distributor then ships a standard length (e.g., five foot long) extruded primary element and a corresponding pressure transmitter to the customer from inventory for next day delivery. The installer measures the duct, cuts the probe or primary element to the appropriate length, and installs the unit complete with pressure transmitter. After installation the customer can check the differential pressure induced on the transmitter. The customer can then let the manufacturer or distributor know the differential pressure generated and the measured internal duct dimensions. The manufacturer can run the flow calculation and provide the flow calculation to the customer, allowing the manufacturer to answer any questions.

Figure 1:
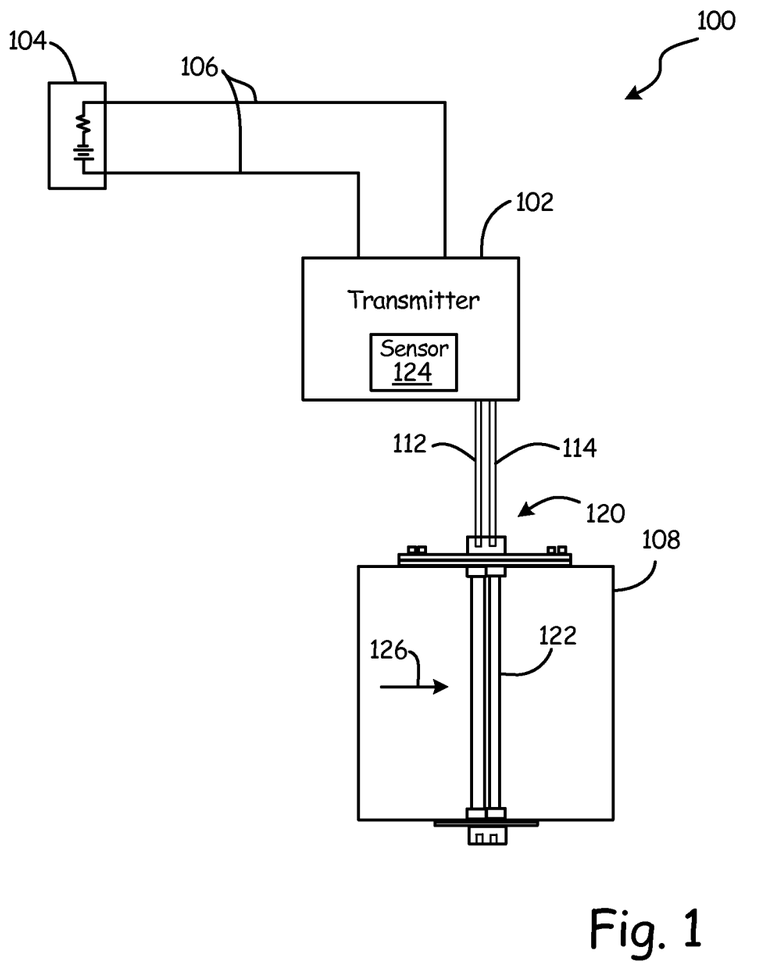
FIG. 1 is a diagrammatic illustration of an industrial process control or monitoring system which uses an averaging pitot tube (APT) probe for use in monitoring or controlling a process fluid, namely a gas, in a duct in accordance with an example embodiment.

FIG. 1 is a simplified diagram showing an industrial process control or monitoring system 100 for use in monitoring or controlling a process fluid, namely a gas, in an industrial process. Typically, a field device such as a process variable transmitter 102 is located at a remote location in a field, and transmits a sensed process variable back to a centrally-located control room 104. Various techniques can be used for transmitting the process variable, including both wired and wireless communications. One common wired communication technique uses what is known as a two-wire process control loop 106 in which a single pair of wires is used to both carry information as well as provide power to the transmitter 102. One technique for transmitting information is by controlling the current level through the process control loop 106 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including wirelessHART® in accordance with IEC 62591 protocol, may also be implemented. Process control loop 106 in FIG. 1 represents either or both of wired and wireless embodiments of communication connections between transmitter 102 and control room 104.

Process variable transmitter 102 is connected, via a pair of pressure conveying lines 112 and 114 in one example embodiment which is shown in FIG. 1, to a duct mounted APT probe 120 which includes a portion 122 that extends into a process duct 108 and is configured to measure a process variable of a process fluid (e.g., a gas) in the process duct 108. As discussed below in more detail, portion 122 of probe 120 is cuttable such that it may be customized for a particular duct size. The directional arrow 126 indicates the direction of fluid flow in duct 108. Process variable transmitter 102 includes a sensor 124 and other components/circuitry (not shown in FIG. 1) that are configured to receive a differential pressure from probe 120 and provide a transmitter output on process control loop 106.

In exemplary embodiments, process variable transmitter 102 is a differential pressure transmitter and probe 120 is an averaging pitot tube (APT) type of probe. Components of differential pressure transmitter 102 and APT probe 120 are described below in greater detail. Disclosed embodiments include a cuttable probe primary element which can include features described below, for example with reference to FIGS. 4 and 5. Further, the cuttable primary element can be mounted in the duct using duct mount apparatus described below, for example with reference to FIGS. 6-9. The various primary element embodiments and duct mount apparatus can be used, in some embodiments, with a wide variety of different types of mount or head assemblies that provide pressure connections to transmitter 102, and/or with various types of attachment mechanisms that couple the probe to the head assembly, to the transmitter, or to other components.

As will be described below in greater detail, in some embodiments APT probe 120 is of a design that allows the probe to be made with a plastic extruded primary element that avoids the challenges of the traditional APT primary element distribution model while using contemporary complimentary components. However, APT probe 120 may be made of materials other than plastic.

Figure 2:
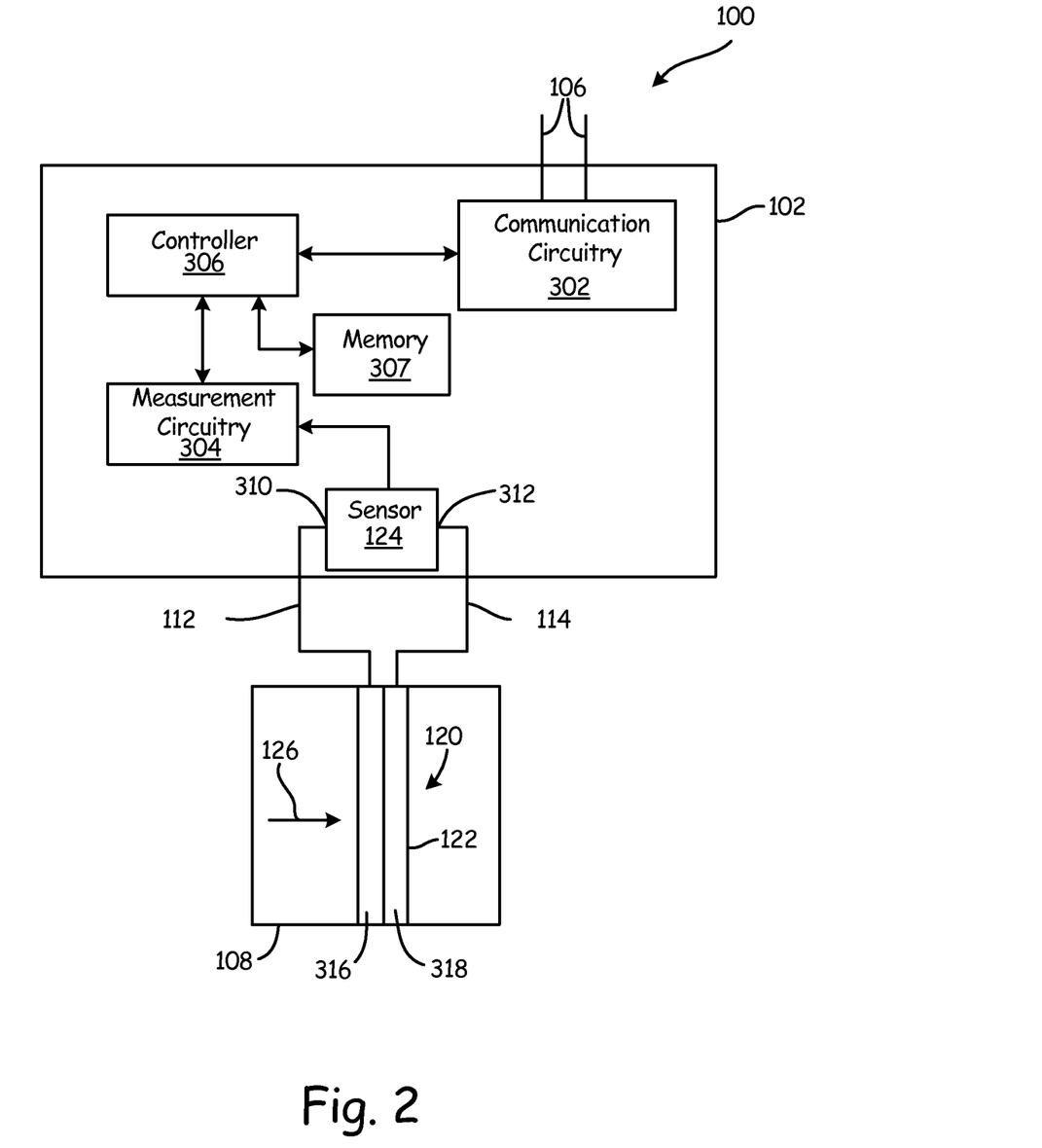
FIG. 2 is a block diagram of the system and transmitter shown in FIG. 1 in accordance with an example embodiment.

Referring now to FIG. 2, shown is a system block diagram of an exemplary differential pressure measurement system embodiment of monitoring system 100. As shown, system 100 includes flow transmitter 102 and differential pressure generating APT probe 120. System 100 is coupleable to a process control loop such as loop 106 and is adapted to communicate a process variable output related to a differential pressure of fluid flow within duct 108. Transmitter 102 of system 100 includes a loop communication circuitry 302, pressure sensor 124, measurement circuitry 304, controller 306 and memory device 307 which can store programming instructions, configuration information, variables, etc.

Loop communication circuitry 302 is coupleable to the process control loop 106 and is adapted to communicate upon the process control loop 106. Loop communication circuitry 302 can communicate over a wired or wireless communication link and/or a wireless communication link as discussed above. Pressure sensor 124 includes first and second ports 310, 312 which couple to pressures in first and second plenums 316, 318, respectively, through pressure conveying lines 112 and 114. Plenums 316 and 318 include, in exemplary embodiments, continuous or discrete slots or openings which couple to respective upstream and downstream pressures. Sensor 124 can be any device that has an electrical characteristic that changes in response to changes in applied pressure. For example, sensor 124 can be a capacitive pressure sensor the capacitance of which changes in response to the differential pressure applied between ports 310 and 312. If desired, sensor 124 can include a pair of pressure sensitive elements such that each plenum 316, 318 is coupled to its own pressure sensitive element.

Measurement circuitry 304 provides an output related to differential pressure between ports 310 and 312. Measurement circuitry 304 can be any electronic circuitry that can provide a suitable signal related to differential pressure. For example, measurement circuitry can be an analog-to-digital converter, a capacitance-to-digital converter or any other appropriate circuitry. Controller 306 provides an output related to flow to loop communication circuitry 302. The flow output is related to the sensor output provided by measurement circuitry 304. Controller 306 determines flow rate based upon the output from sensor 124 using known techniques. Controller 306 can be a programmable gate array device, a microprocessor, or any other appropriate device or devices. In some embodiments, configuration information is stored in memory 307 based on the measured span of the duct such that the probe and transmitter 102 are optimized or configured to provide process variable outputs based on empirical data.

As discussed above, APT probe 120 includes plenums 316, 318. A "plenum" is a passageway, a channel, a tube or the like into which fluid of a particular character or pressure is directed or admitted and through which the pressure is conducted or conveyed. As described, in exemplary embodiments, plenums 316 and 318 include continuous slots, or discrete openings or holes, extending longitudinally in an extruded plastic or other material primary element used to form probe 120.

Figure 3:
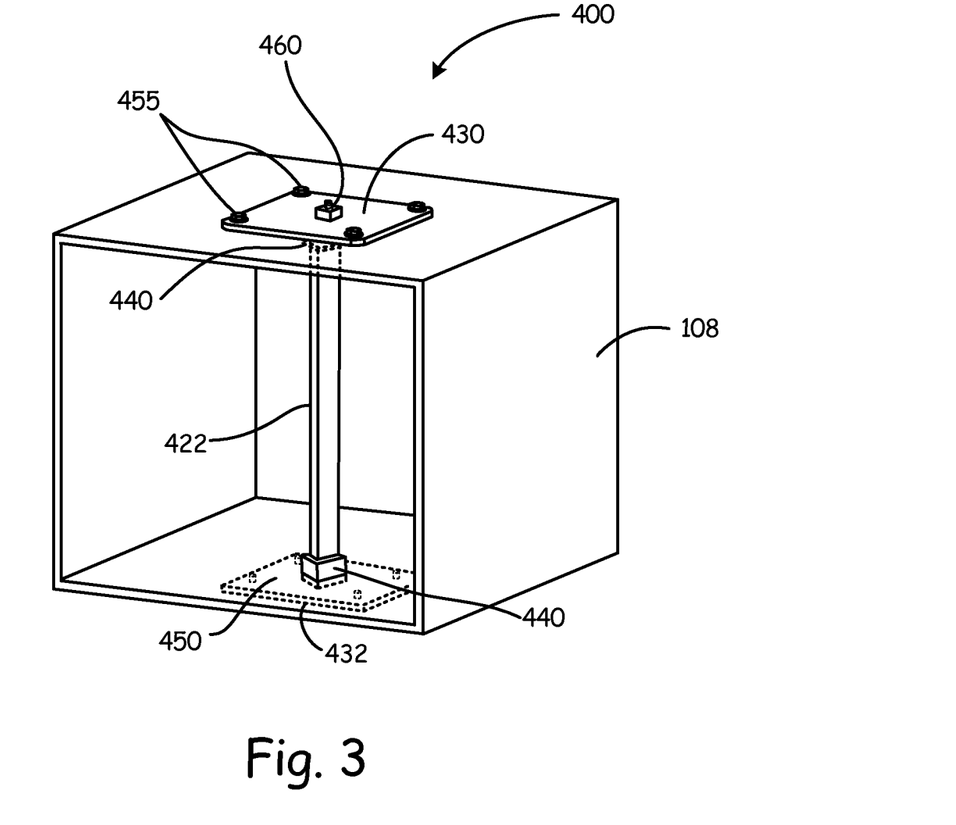
FIG. 3 is an illustration of an embodiment of a duct mounted APT assembly.

Referring now to FIG. 3, shown is a diagrammatic perspective view of a duct mount APT assembly 400 mounted in duct 108 in accordance with exemplary disclosed embodiments. Duct mount APT assembly 400 includes primary element 422 (an embodiment or component of probe 120) made from extruded plastic or other material, with continuous slots or discrete openings (510 and 520 shown in greater detail in FIGS. 4 and 5) in the upstream and downstream faces of the primary element 422. Duct mount flanges 430 and 432 are attached to the exterior of duct 108 and are used to mount primary element 422 to duct 108. In particular, flare fittings 602 (shown in FIG. 6) and in some embodiments, an integrated cowl 440, of duct mount flanges 430 and 432 are inserted into respective openings cut into duct 108. Duct flange gaskets 450 are positioned between each of flanges 430/432 and the exterior of duct 108 to seal the regions surrounding the openings in duct 108 through which the flare fittings 602 are inserted to prevent fluid leakage. Fasteners, such as self-tapping sheet metal screws 455, bolts, etc., secure flanges 430 and 432 to the exterior of duct 108, and thereby secure primary element 422 in position for measurement within duct 108. Pressure taps 460 are included on at least one of flanges 430/432 for coupling the plenums within the primary element to sensor 124 through lines 112/114, etc. Threaded plugs can be provided for pressure taps 460. As described below in greater detail, in some exemplary embodiments flanges 430 and 432 are identical and each include pressure taps 460.

An advantage of duct mounted APT assembly 400 is that the primary element 422 can be shipped from the manufacturer in one or more standard lengths, and then cut to fit a particular duct in the field during the installation process. Further, the particular installation can be characterized and configured after the APT has been installed. The primary element itself is formed of extruded plastic or other material with one or more longitudinal slots or discrete openings on the upstream and downstream faces, and thus provides a low cost alternative to conventional APT primary elements customized for specific application requirements.

Figure 4:
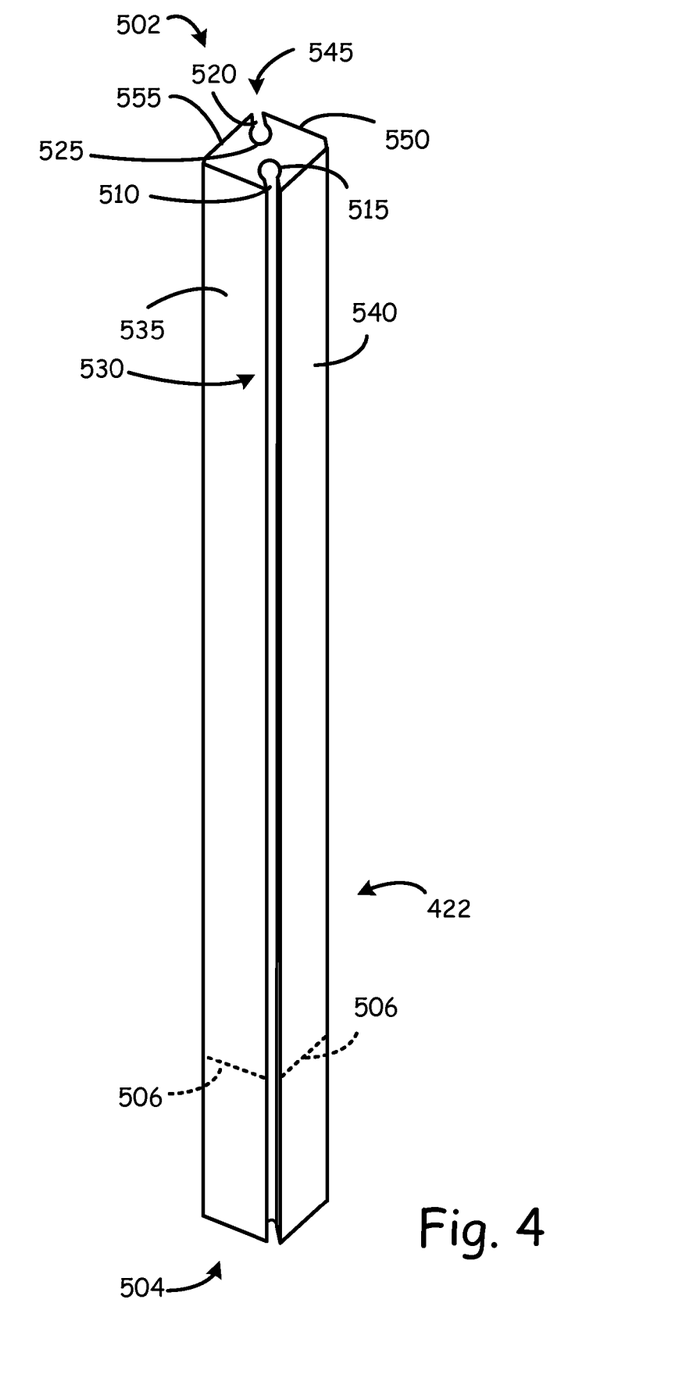
FIGS. 4 and 5 are illustrations of one exemplary embodiment of the APT primary element shown in FIG. 3.
Figure 5:
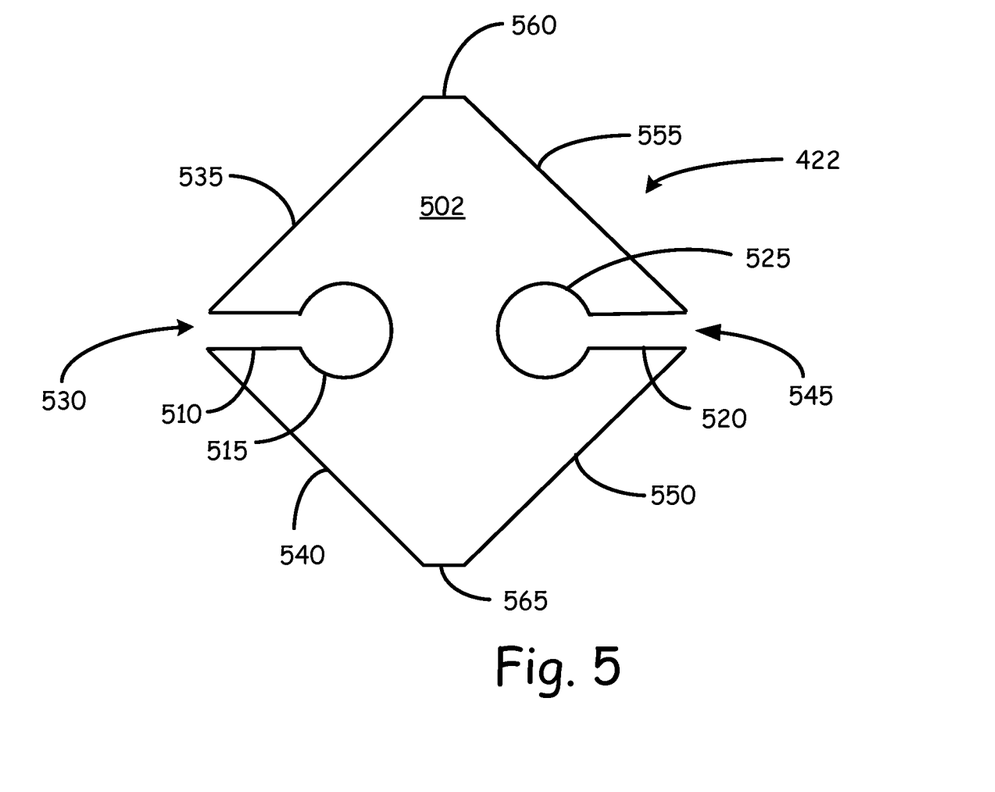

An example of cuttable primary element 422 having a shape with these new features is shown in greater detail in the isometric and cross section views in FIGS. 4 and 5. Primary element 422 extends longitudinally from a first or top end 502 to a second or bottom end 504. In these illustrations, the primary element 422 is shown to have a symmetrical shape that allows bidirectional flow measurement. The symmetrical shape also allows primary element 422 to be cut anywhere along its length, ideally in a plane perpendicular to its longitudinal direction. For example, a cutting plane 506 is illustrated in FIG. 4 by dashed lines.

In alternative embodiments, other shaped primary elements, formed from extruded plastic or other materials and using other techniques, can be used. For example T-shaped primary elements which generate a larger differential pressure signal for a given fluid velocity could be used to enhance performance in some applications. In yet other embodiments, a wider primary element with relatively sharp edges can be used to increase blockage and ensure a fixed vortex shedding location. Such a primary element could provide excellent low Reynolds number performance and have inherent low velocity measurement advantages. An ideal or preferred shape for the primary element can be determined and chosen empirically for particular applications. Although various different shapes of primary elements can be employed, disclosed embodiments are described primarily with reference to primary elements made from extruded plastic or other material and having continuous slots or discrete holes or openings extending longitudinally along the length of the primary element.

Referring again to FIGS. 4 and 5, primary element 422 has an upstream face 530 and a downstream face 545. Upstream face 530 has longitudinal slot 510 which opens to longitudinally extending internal chamber 515. Slot 510 and internal chamber 515 extend, in exemplary embodiments, the entire length of primary element 422. Upstream face 530 can also be considered to include adjacent outer surfaces 535 and 540 of primary element 422 on either side of slot 510. Downstream face 545 has longitudinal slot 520 which opens to longitudinally extending internal chamber 525. Slot 520 and internal chamber 525 also extend, in exemplary embodiments, the entire length of primary element 422. Downstream face 545 can also be considered to include adjacent outer surfaces 550 and 555 of primary element 422 on either side of slot 520. In some embodiments, and as best shown in FIG. 5, beveled edge surfaces 560 and 565 are positioned between surfaces 535 and 555, and between surfaces 540 and 550, respectively. Beveled edge surfaces need not be included in all embodiments.

Figure 6:
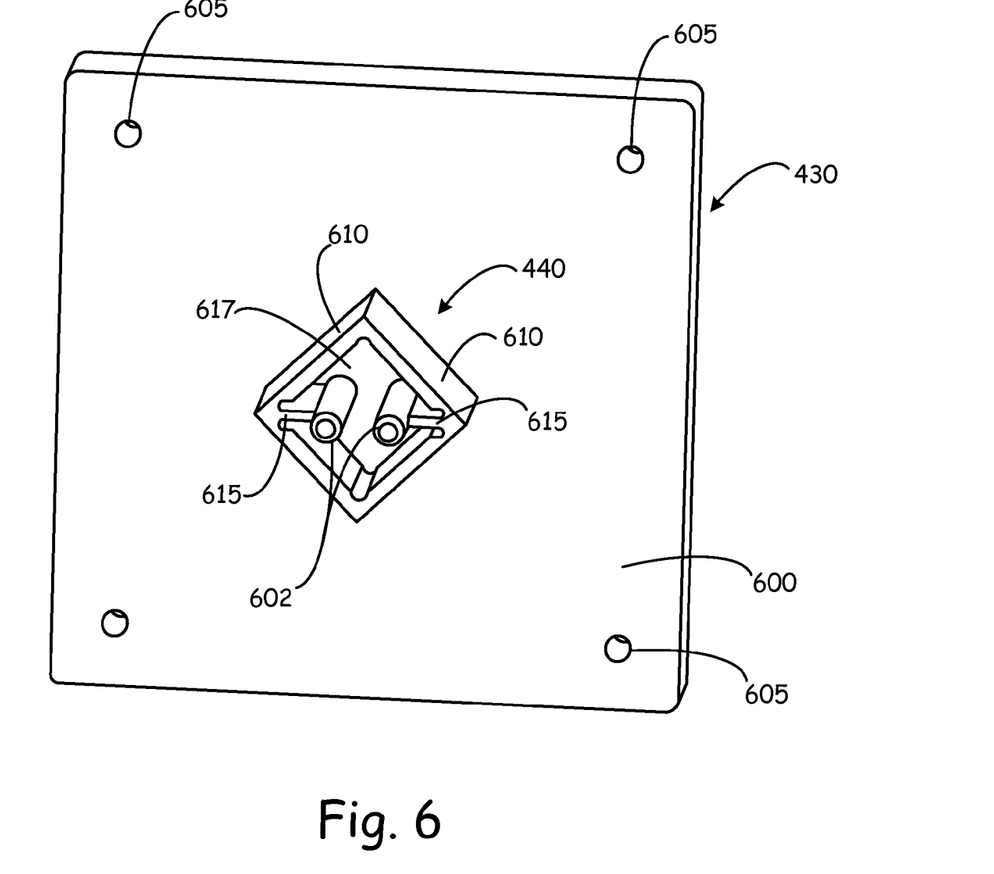
FIGS. 6-8 are illustrations of flange components of the duct mounted APT assembly in accordance with an example embodiment.
Figure 7:
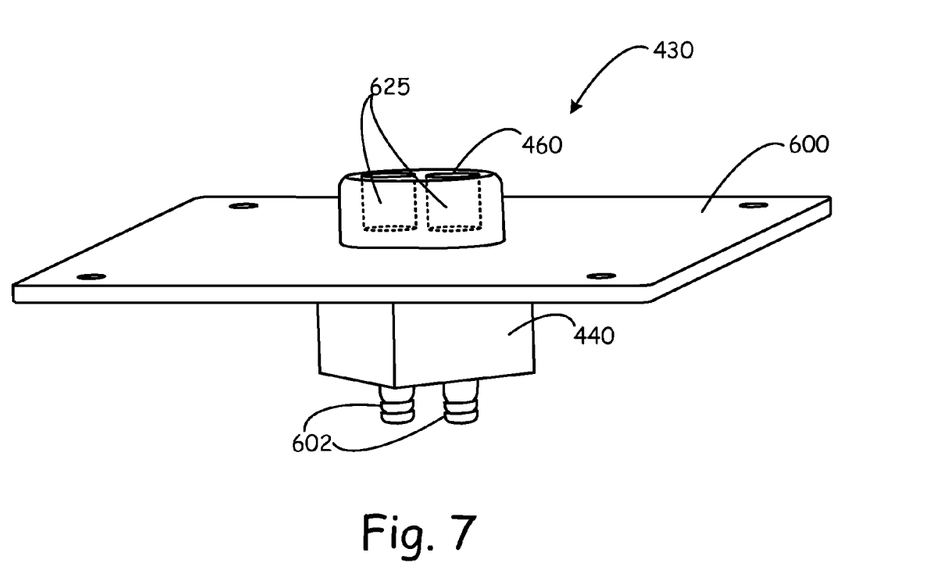
Figure 8:
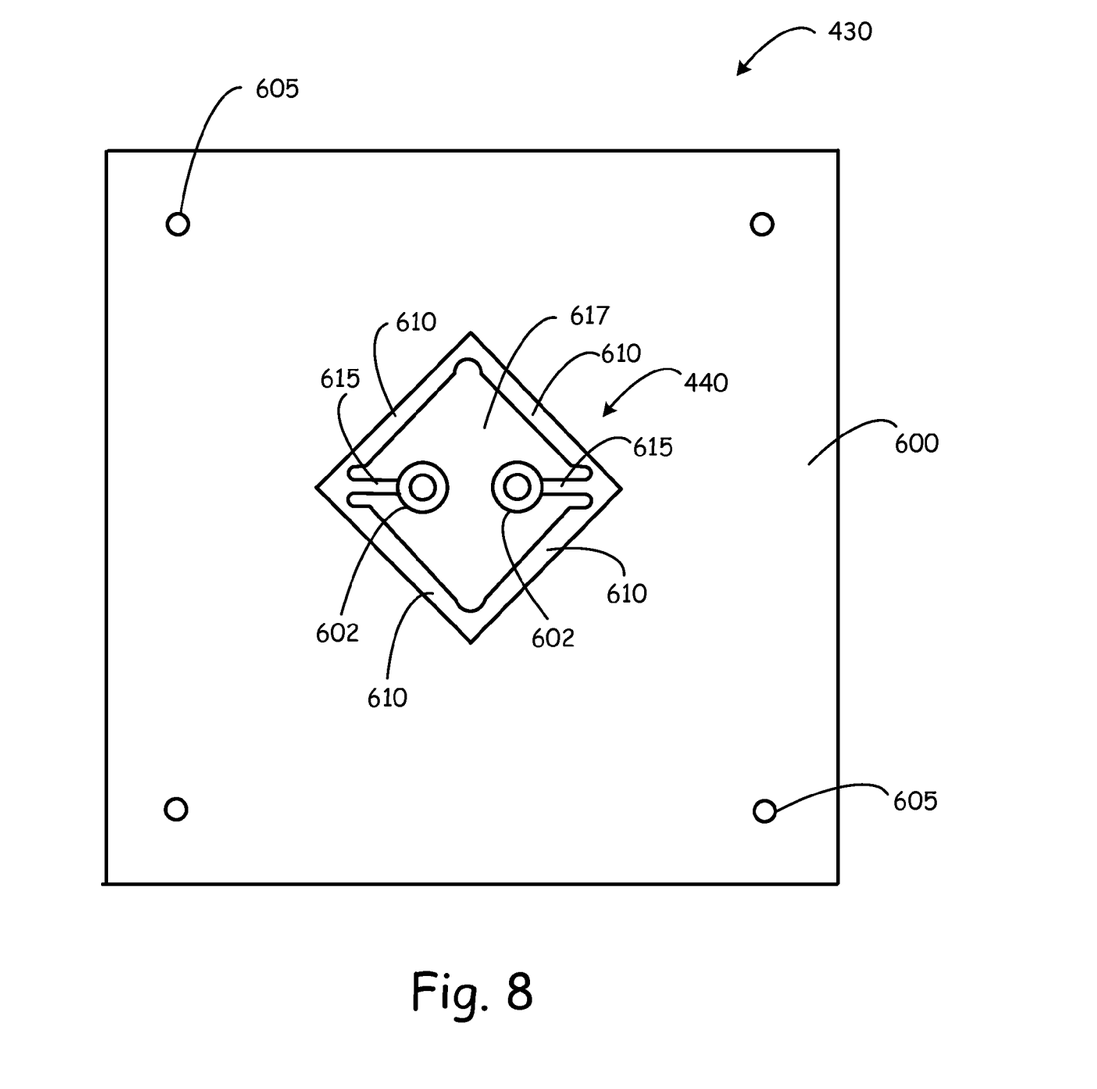

In duct mount APT assembly 400, the slotted shape of primary element 422 is used in conjunction with specially fabricated duct mount flanges shown in FIGS. 6-8. Flanges 430 and 432 discussed above can be of identical or similar construction. Therefore, for illustrative purposes, only flange 430 is described in FIGS. 6-8.

FIG. 6 is a bottom perspective view of duct mount flange 430 in an exemplary embodiment. FIGS. 7 and 8 are side perspective and bottom views, respectively, of duct mount flange 430. In an exemplary embodiment, each duct mount flange 430 also includes a flat plate to allow installation on the duct wall, a cowl 440 and flare fittings 602. Fins 615 extend between the fittings 602 and the cowl 440. In embodiments in which the primary element includes discrete apertures or slots, fins 615 can be omitted in certain designs. Flat plate 600 can include apertures 605 oriented and sized to receive fasteners 455, such as self-tapping screws, to secure flat plate 600 and thereby flange 430 to the duct wall.

Referring still to FIGS. 6-8, cowl 440 has a shape with cowl walls 610 configured to receive and end of primary element 422 into the interior space 617 formed by cowl walls 610 and to provide support for the primary element. Flare fittings 602 are each coupled to one of passageways 625 (shown in FIG. 8) extending through flat plate 600 and to corresponding pressure taps 460. During installation, the flare fittings 602 are inserted into the round internal pressure chambers 515 and 525 within the primary element 422. The fittings 602 can be made of metal and be slightly larger in diameter than the internal pressure chambers 515 and 525 of the primary element 422. This geometry ensures solid connection and a pressure seal via interference fit between the primary element and the duct flange 430. As mentioned, the same connections and fit also occur between flange 432 and primary element 422 and the second end of primary element.

In some exemplary embodiments for example as shown in FIG. 8, the walls 610 of the surrounding cowl 440 are connected to the flare fittings 602 via fins 615 extending between walls 610 (or corners between walls 610) and the flare fittings 602. These fins 615 slide into the pressure slots 510 and 520 on the primary element 422 during installation. This feature prevents differential pressure signal loss through the stagnation zone within the cowl, and provides additional structural support for the primary element. The cowl both supports the primary element and covers/plugs the slots 510/520 in the primary. By covering the slots near the wall of the duct, the cowl mitigates signal attenuation from sampling in low velocity wall affected zones. In embodiments in which discrete openings are utilized instead of continuous slots, fins connecting the cowl to the fittings would typically be omitted. Also, in embodiments where openings are used instead of a slot, an end user can cut both sides of the bar or element, if necessary, to center the openings in the duct.

In exemplary embodiments, the primary element 422 is symmetrical with identical duct flange assemblies 430/432 on either end 502/504. The "head" end 502 of the primary element is plumbed to the differential pressure transmitter, with the internal chambers 515/525 being fluidically coupled to the sensor 124 through flare fittings 602, passageways 625, pressure taps 460, pressure conveying lines 112 and 114, etc. The "tip" end 504 of the primary element 422 would have pressure taps 460, and thereby passageways 625, sealed with NPT plugs. The duct flanges 430/432 are sealed to the exterior of the customer's duct 108 via sheet metal screws or fasteners and a duct gasket as discussed above. An advantage of this assembly is that the duct gaskets, self-tapping sheet metal screws or other fasteners, and threaded plugs that compose the remainder of the primary element are all low cost, readily available materials.

Figure 9:
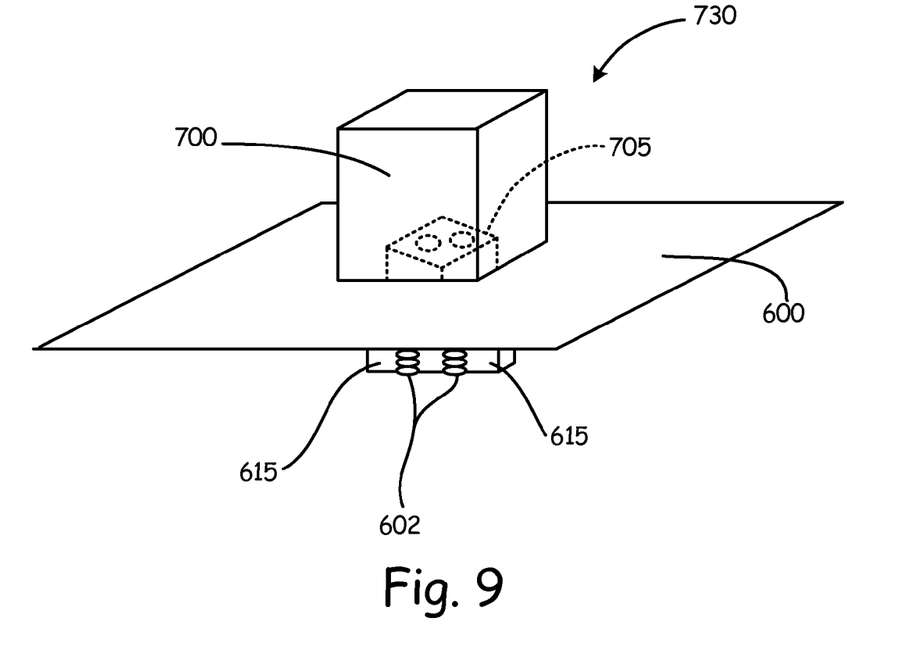
FIG. 9 is an illustration of flange components of the duct mounted APT assembly in accordance with an alternate embodiment.

In alternate embodiments, a duct mount flange assembly which connects to the bar or primary element 422 on the outside of the duct can be used. One such alternate embodiment is provided as an example in FIG. 9. In FIG. 9, duct mount flange 730 is shown to have a support structure 700 connected or coupled to flange 600 on the side opposite the duct such that it will be positioned outside of the duct when supporting the primary element. Here, the fittings 602 and fins 615 are shown on the duct side of flange 600. The dashed line structure 705 is inside of support structure 700, providing an aperture or hole for the primary element or bar 422. Since the support is outside of the duct, there is no cowl intruding on the flow within the duct. The profile of the flow path is only that of the cuttable primary element or bar 422.

Figure 10:
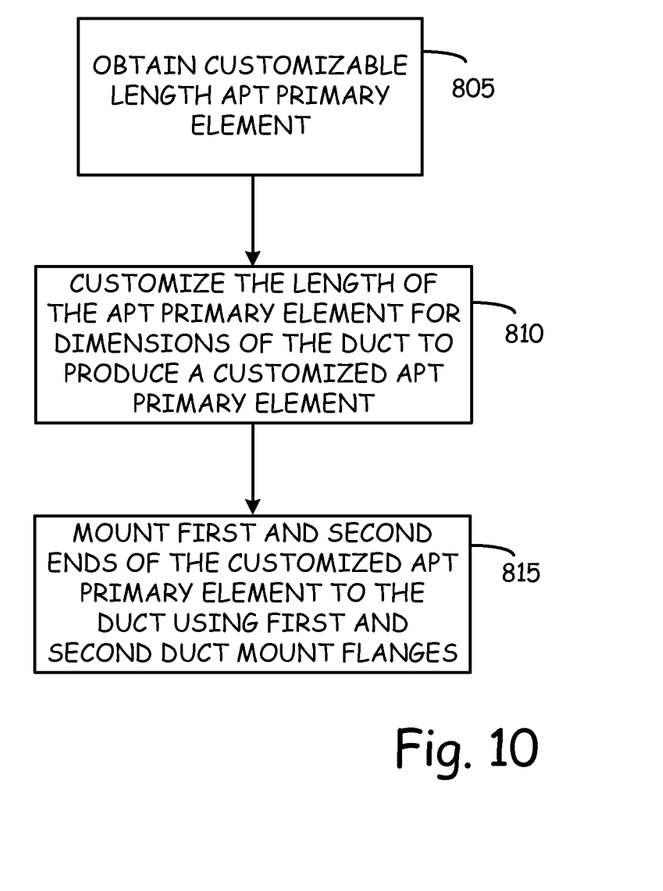
FIG. 10 is a flow diagram illustrating an embodiment of a method of installing an APT assembly in a duct.

Referring now to FIG. 10, shown is a flow diagram illustrating an embodiment of a method of installing an APT assembly in a duct to measure a flow of fluid in the duct in accordance with the disclosure made with reference to FIGS. 1-9. As shown at 805, the method includes the step of obtaining a customizable length APT primary element 422. As discussed, the APT primary element has first and second internal chambers 515 and 525. The APT primary element also has an upstream face 530 with an upstream opening 510 which opens to the first internal chamber and a downstream face 545 with a downstream opening 520 which opens to the second internal chamber. In some embodiments, the customizable length APT primary element obtained in this step has a single longitudinal slot for one or both of the upstream opening and the downstream opening.

Next, as shown at 810, the method includes the step of customizing the length of the APT primary element for dimensions of the duct to produce a customized APT primary element. The customized APT primary element has first and second ends 502, 504, with the first and second internal chambers, the upstream face and the downstream face extending from the first end to the second end. In some embodiments, the step of obtaining length shown at 805 includes selecting the customizable length APT primary element from one of multiple standard APT primary element lengths, while the step shown at 810 of customizing the length includes subsequently cutting the APT primary element based on the dimensions of the duct.

As shown at 815, the method also includes the step of mounting the first and second ends of the customized APT primary element to the duct, with the customized APT primary element extending across the duct, using first and second duct mount flanges 430, 432. This step can include inserting flare fittings 602 on each of the first and second duct mount flanges into the first and second internal chambers of the customized APT primary element at the first and second ends, and attaching a flange plate 600 of each of the first and second duct mount flanges to the duct. In some embodiments, the step can also include inserting fins 615 on each of the first and second duct mount flanges into the upstream and downstream openings 510, 520 of the customized APT primary element.

Although the present invention has been described with reference to preferred embodiments, workers skilled in the art will recognize that changes may be made in form and detail without departing from the spirit and scope of the invention.

What is claimed is:

1. A duct mount averaging pitot tube (APT) assembly for use with a duct to measure a flow of fluid in the duct, the APT assembly comprising:
   an APT primary element extending longitudinally between a first end and a second end, the APT primary element having first and second internal chambers extending longitudinally between the first and second ends, the APT primary element having an upstream face with an upstream opening which opens to the first internal chamber and extends from the first end to the second end, and a downstream face with a downstream opening which opens to the second internal chamber and extends from the first end to the second end; and
   first and second duct mount flanges configured to respectively mount the first and second ends of the APT primary element to the duct when the APT primary element is inserted in the duct.

2. The duct mount APT assembly of claim 1, wherein the APT primary element is formed from extruded material.

3. The duct mount APT assembly of claim 1, wherein the APT primary element is shaped to be cuttable between the first end and the second end to customize the length of the APT primary element while maintaining end profiles of the APT primary element.

4. The duct mount APT assembly of claim 1, wherein at least one of the first and second duct mount flanges comprises: a flange plate; first and second flare fittings on a first side of the flange plate and configured to be inserted into the first and second internal chambers at the corresponding end of the APT primary element; and a cowl on the first side of the flange plate surrounding the first and second flare fittings and configured to receive the corresponding end of the APT primary element when the first and second flare fittings are inserted into the first and second internal chambers.

5. The duct mount APT assembly of claim 4, wherein the flange plate further comprises apertures for receiving fasteners to attach the flange plate to the duct to thereby mount the APT primary element in the duct.

6. The duct mount APT assembly of claim 4, wherein the first and second flare fittings are sized larger than the first and second internal chambers to form a sealing fit when the first and second flare fittings are inserted into the first and second internal chambers.

7. The duct mount APT assembly of claim 4, wherein the at least one of the first and second duct mount flanges further comprises a first fin on the first side of the flange plate extending from the first flare fitting to a wall of the cowl and configured to be inserted into the upstream opening when the first flare fitting is inserted into the first internal chamber, and a second fin on the first side of the flange plate extending from the second flare fitting to a wall of the cowl and configured to be inserted into the downstream longitudinal slot when the second flare fitting is inserted into the second internal chamber.

8. The duct mount APT assembly of claim 7, wherein the at least one of the first and second duct mount flanges further comprises pressure taps on a second side of the flange plate for coupling to an external pressure sensor, the pressure taps connected to the first and second flare fittings by passageways extending through the flange plate.

9. The duct mount APT assembly of claim 1, wherein the upstream face of the APT primary element further comprises first and second outer surfaces of the APT primary element respectively adjacent and on either side of the upstream opening, and wherein the downstream face of the APT primary element further comprises third and fourth outer surfaces of the APT primary element respectively adjacent and on either side of the downstream opening.

10. The duct mount APT assembly of claim 9, wherein the APT primary element further comprises a first beveled edge surface between the first and second outer surfaces, and a second beveled edge surface between the third and fourth outer surfaces.

11. The duct mount APT assembly of claim 1, wherein at least one of the upstream opening and the downstream opening comprises a single longitudinal slot.

12. The duct mount APT assembly of claim 11, wherein the single longitudinal slot extends from the first end of the APT primary element to the second end of the APT primary element.

13. A method of installing an averaging pitot tube (APT) assembly in a duct to measure a flow of fluid in the duct, the method comprising:
obtaining an APT primary element having first and second internal chambers, the APT primary element extending longitudinally between a first end and a second end and having an upstream face with an upstream opening which opens to the first internal chamber and extends from the first end to the second end, and a downstream face with a downstream opening which opens to the second internal chamber and extends from the first end to the second end;
changing the length of the APT primary element for dimensions of the duct to produce a customized APT primary element, the customized APT primary element having first and second ends, the first and second internal chambers, the upstream face and the downstream face of the customized APT primary element extending from the first end to the second end; and
mounting the first and second ends of the customized APT primary element to the duct, with the customized APT primary element extending across the duct, using first and second duct mount flanges.

14. The method of claim 13, wherein mounting the first and second ends of the customized primary element to the duct using the first and second duct mount flanges further comprises inserting flare fittings on each of the first and second duct mount flanges into the first and second internal chambers of the customized APT primary element at the first and second ends, and attaching a flange plate of each of the first and second duct mount flanges to the duct.

15. The method of claim 14, wherein mounting the first and second ends of the customized primary element to the duct using the first and second duct mount flanges further comprises inserting fins on each of the first and second duct mount flanges into the upstream and downstream openings of the customized APT primary element.

16. The method of claim 13, wherein obtaining the APT primary element further comprises selecting the length APT primary element from one of a plurality of standard APT primary element lengths, and wherein the changing of the length of the APT primary element further comprises cutting the APT primary element based on the dimensions of the duct.

17. The method of claim 13, wherein obtaining an APT primary element includes extruding an APT primary element.

18. A duct mount averaging pitot tube (APT) assembly for use with a duct to measure a flow of fluid in the duct, the APT assembly comprising:
an APT primary element extending longitudinally between a first end and a second end, the APT primary element having first and second internal chambers extending longitudinally between the first and second ends, the APT primary element having an upstream face with an upstream opening which opens to the first internal chamber and extends from the first end to the second end, and a downstream face with a downstream opening which opens to the second internal chamber and extends from the first end to the second end; and
first and second duct mount flanges configured to respectively mount the first and second ends of the APT primary element to the duct when the APT primary element is inserted in the duct, wherein at least one of the first and second duct mount flanges comprises:
a flange plate; and
a cowl on the flange plate and configured to receive the corresponding end of the APT primary element.

19. The duct mount APT assembly of claim 18, wherein at least one of the first and second duct mount flanges comprises first and second flare fittings on a first side of the flange plate and are configured to be inserted into the first and second internal chambers at the corresponding end of the APT primary element, and wherein the cowl surrounds the first and second flare fittings and is further configured to receive the corresponding end of the APT primary element when the first and second flare fittings are inserted into the first and second internal chambers.

20. The duct mount APT assembly of claim 19, wherein the at least one of the first and second duct mount flanges further comprises a first fin on the first side of the flange plate extending from the first flare fitting to a wall of the cowl and configured to be inserted into the upstream opening when the first flare fitting is inserted into the first internal chamber, and a second fin on the first side of the flange plate extending from the second flare fitting to a wall of the cowl and configured to be inserted into the downstream longitudinal slot when the second flare fitting is inserted into the second internal chamber.

* * * * *